US008820347B2

(12) United States Patent
Mann

(10) Patent No.: US 8,820,347 B2
(45) Date of Patent: Sep. 2, 2014

(54) PASSIVE OVERPRESSURE AND UNDERPRESSURE PROTECTION FOR A CRYOGEN VESSEL

(75) Inventor: Nicholas Mann, Compton (GB)

(73) Assignee: Siemens PLC, Frimley, Camberley, Surrey (GB)

( * ) Notice: Subject to any disclaimer, the term of this patent is extended or adjusted under 35 U.S.C. 154(b) by 556 days.

(21) Appl. No.: 12/463,740

(22) Filed: May 11, 2009

(65) Prior Publication Data

US 2009/0277517 A1 Nov. 12, 2009

(30) Foreign Application Priority Data

May 12, 2008 (GB) .................................. 0808442.8

(51) Int. Cl.
*G05D 7/06* (2006.01)

(52) U.S. Cl.
USPC ........ 137/486; 251/336; 251/337; 137/487.5; 137/496; 137/497

(58) Field of Classification Search
CPC ............... F01L 3/10; B25D 9/14; G05D 7/03; G05D 7/0635
USPC ........ 137/487.5, 486.5, 486, 496, 497, 493.5, 137/269.5, 533.21; 251/129.21, 336, 337
See application file for complete search history.

(56) References Cited

U.S. PATENT DOCUMENTS

| | | | | |
|---|---|---|---|---|
| 2,212,626 A * | 8/1940 | Thomas | 137/116.5 |
| 4,655,045 A * | 4/1987 | Matsumoto et al. | 62/51.1 |
| 4,841,268 A | 6/1989 | Burnett et al. | |
| 6,019,347 A * | 2/2000 | Adams et al. | 251/129.21 |
| 6,560,969 B1 | 5/2003 | Eckels | |
| 6,802,333 B2 * | 10/2004 | Balazy et al. | 137/110 |
| 2002/0029804 A1 * | 3/2002 | Liorati et al. | 137/486 |

FOREIGN PATENT DOCUMENTS

| | | |
|---|---|---|
| JP | 64-46585 A | 2/1989 |
| JP | 1-131381 A | 5/1989 |
| JP | 5-335636 A | 12/1993 |
| JP | 8-178496 A | 7/1996 |
| JP | 9-64425 A | 3/1997 |
| JP | 2003-69092 A | 3/2003 |
| JP | 2003-336921 A | 11/2003 |
| JP | 2005-203704 A | 7/2005 |
| JP | 2006-165009 A | 6/2006 |

OTHER PUBLICATIONS

UK Examination and Search Report, dated: May 30, 2008 (2 pages).
Japanese Office Action dated Feb. 19, 2013 w/ English translation (five (5) pages).

* cited by examiner

*Primary Examiner* — Jason Boeckmann
*Assistant Examiner* — Joel Zhou
(74) *Attorney, Agent, or Firm* — Crowell & Moring LLP

(57) ABSTRACT

In a magnet system for MRI imaging comprising a superconducting magnet mounted within a cryogen vessel, apparatus is provided for controlling egress of cryogen gas from the cryogen vessel. The apparatus comprises a controlled valve linking the interior of the cryogen vessel to a gas exit path; and a controller arranged to control the valve. The valve is arranged such that a gas pressure in the cryogen vessel exceeding a gas pressure in the gas exit path acts on the valve to open the valve and allow venting of cryogen gas. The valve is also arranged such that a gas pressure in the cryogen vessel inferior to a gas pressure in the gas exit path acts on the valve to urge it closed, so restricting flow of gas into the cryogen vessel.

5 Claims, 3 Drawing Sheets

PASSIVE OVERPRESSURE AND UNDERPRESSURE PROTECTION FOR A CRYOGEN VESSEL

The present invention relates to apparatus for regulating gas pressures inside vessels and gas flow from vessels. It particularly relates to the passive over-pressure and under-pressure protection, by appropriate selection and arrangement of a gas flow control valve for control of gas pressure in, and flow of gas from, a cryogen vessel such as those known for cooling superconducting magnet coils in MRI imaging systems.

BACKGROUND OF THE INVENTION

FIG. 1 schematically shows a cross-section of an MRI imaging magnet housed within a cryostat. As is well known in the art, such arrangements typically comprise a set of superconducting coils 10 mounted on a former (not shown), suspended in a cryogen vessel 12 which is partially filled with liquid cryogen 14. The liquid cryogen is selected such that its boiling point is below the superconducting transition temperature of the wire used in the coils 10. An outer vacuum container OVC 16 surrounds the cryogen vessel. The space 18 between the inner surface of the OVC and the outer surface of the cryogen vessel is evacuated, to reduce heat influx to the cryogen vessel by convection. One or more thermal radiation shields 19 may be provided in the evacuated space, to reduce thermal influx to the cryogen vessel by radiation. A solid thermal insulating layer such as aluminium coated polyester sheets 19*a* may also be provided within the evacuated space, to further reduce thermal influx. Careful design of support and suspension members 20 reduces heat influx to the cryogen vessel by conduction.

The coils 10 are provided with electrical current by current leads 22 leading into the cryogen vessel through an access turret 24. The access turret typically also provides a venting path 25 for cryogen gas to escape. It is necessary to allow cryogen gas to escape for several reasons, depending on the state of operation of the magnet which comprises coils 10. The present invention relates to the equipment provided to allow venting of cryogen gas. Some examples of situations which require the venting of cryogen gas are as follows. During operation, the cryogen vessel 12 must remain sealed against air ingress, yet the gas pressure within the cryogen vessel must be accurately controlled to maintain the correct thermal environment for the superconducting coils.

Control of cryogen gas venting during all normal operating conditions (cryogen fill, ramp, and operation at field) may be achieved using a direct-acting mechanical valve. Achieving the required control precision with such mechanical valves has proved difficult and expensive. Consequences of this poor control include less-than-ideal coil temperatures during ramping, with consequently increased risk of quench, and increased cryogen losses.

The mechanical vent valve depends on the balance of gas pressures and spring forces to modulate the opening of the valve's plate. The operating forces in a valve of this type are small, and consequently performance is sensitive to small changes in spring force, friction, operating temperature, and a range of manufacturing tolerances. Expensive calibration and conditioning techniques are used to reduce these effects, but despite this, pressure control performance is only just adequate for the application and reliability is poor.

Examples of such valves include a simple spring-loaded valve which opens when the pressure inside the cryogen vessel exceeds the pressure on the other side of the valve by an amount sufficient to overcome the bias force provided by the spring. The valve is opened by an excess of pressure on the cryogen-vessel side, and is closed by a spring acting against the pressure of the cryogen vessel. In the case of over-pressure within the cryogen vessel, the pressure acts on the valve against the spring to vent cryogen from the cryogen vessel. Should the pressure within the cryogen vessel fall below the pressure on the other side of the valve, typically atmospheric pressure, then that pressure will act on the valve in support of the spring to hold the valve firmly shut and prevent unwanted ingress of air to the cryogen vessel. A passive over-pressure and under-pressure protection is accordingly provided.

The internal cryogen vessel pressure required to open such valves may vary according to external influences. For example, the absolute cryogen vessel pressure required to open the simple spring loaded valve will vary with atmospheric pressure acting on the "downstream" side of the valve. While one may have designed and intended such mechanical valves to operate to maintain a certain absolute pressure within the cryogen vessel, variations in the absolute pressure required to open the valve will occur. This effect may be reduced by providing a selection of slightly different versions of the valves, and a precise valve type may be chosen from a range of such valves according to the expected atmospheric pressure and ambient temperature to be experienced by the cryogen vessel in operation. This is of course inconvenient, requiring multiple valve types and appropriate arrangements to select the correct valve for installation.

In summary, despite significant development efforts in the past, existing direct-acting vent valves (wherein the valve plate is directly operated by the pressure within a vessel or a spring, or similar) do not provide accurate or optimised control of cryogen vessel pressure for superconducting magnets for MR imaging, and similar apparatus. Due to demanding calibration requirements, such valves are also expensive to manufacture and unreliable in operation.

In known MRI imaging systems and the like, and as shown in FIG. 1, it is customary to provide a magnet supervisory system 30 which receives data from numerous sensors 32, 34; which is in control of electrical current flow in the magnet, and which controls the operation of the magnet system for optimal performance at all times: during ramp-up, in steady state operation; during imaging and during ramp-down.

It has been found difficult to provide a mechanical valve system with effective and reliable on/off operation. Even a small amount of contamination on the valve element or valve seat may cause the valve to leak in the closed position. On the other hand, contamination may prevent the valve from opening completely. In either case, the valve may not maintain the required pressure within the vessel or permit the required gas flow rate from the vessel.

Accordingly, it has been proposed to control venting by a valve 40 fitted with an actuation device, which is controlled using an intelligent controller such as magnet supervisory system 30, which has access to data defining the magnet operational status and existing conditions within the cryogen vessel. In the example illustrated in FIG. 1, sensors 32 and 34 provide data to the magnet supervisory unit 30 indicating the pressure within the cryogen vessel and the flow rate of gas venting from the cryogen vessel. With such an arrangement it is possible to optimise the operating pressure in the cryogen vessel and the vent gas flow rate from the cryogen vessel to suit the magnet operating conditions and/or existing conditions within the cryogen vessel, with consequent advantages including reduced quench risk and reduced losses of cryogen.

The controlled valve 40 may be operated whereby pressure within the cryogen vessel may be reliably maintained within a desired range of values, and/or a venting of gas may be operated when an internal absolute or gauge pressure reaches a certain value. An accurate and predictable control of vent gas flow rate from the cryogen vessel may be maintained as required.

To avoid the risk of air/ice contamination of the cryogen vessel, the pressure within the cryogen vessel 12 is normally maintained above atmospheric by magnet supervisory control system 30; for example by controlling an associated cryogenic refrigerator in accordance with pressure measurements provided by an absolute or gauge pressure transducer 32. However; during ramping, further pressure rise within the cryogen vessel must be strictly limited in order to maintain acceptable magnet temperatures by allowing increased boil-off of the liquid cryogen. As a result of these conflicting requirements, very precise control and measurement of cryogen vessel pressure is required to be provided by the vent valve 40 and the pressure control system, typically included within controller 30.

The controlled valve 40 may have a simple cyclic on/off function. Accurate pressure control is achieved by varying a duty cycle of the on/off state of the valve, eliminating the need for precise calibration of the valve. In such arrangements, the exact flow capacity of the valve is not particularly important, as the pressure measurement and duty cycle adjustment will compensate for minor variations. For example, a very simple control method may operate along the lines of:

(1) Set required absolute pressure within cryogen vessel=x;

(2) detect actual pressure p within cryogen vessel from sensor 32 conventionally provided;

(3) If p>x, increase "open" proportion of valve operation duty cycle; and (4) If p<x, reduce "open" proportion of valve operation duty cycle.

Where control of gas egress flow rate is required, rather than gas pressure, the control method may resemble:

(1) Set required gas egress flow rate from the cryogen vessel=R;

(2) detect actual gas egress flow rate r from the cryogen vessel from a sensor 34 conventionally provided;

(3) If r<R, increase "open" proportion of valve operation duty cycle; and (4) If r>R, reduce "open" proportion of valve operation duty cycle.

Suitable control signals and suitable arrangements for modifying the control signals to provide the required operation may be simply derived by those skilled in the art.

Various control strategies are possible for the valve and may be defined in the software of the control unit. An advantage of such arrangements is that imperfections in the valve hardware may be compensated for in the software of the magnet supervisory control system 30. The control unit conventionally receives data from various sensors fitted to the magnet and elsewhere within the cryogen vessel, indicating such parameters as absolute cryogen vessel pressure and liquid cryogen level. As will be apparent to those skilled in the art, one may employ data provided by such sensors to operate the actively controlled valve of the present invention to control the absolute pressure inside the cryogen vessel within a desired range of values as required for any of a number of operational situations and requirements. The required valve control may be based on measurements of cryogen vessel pressure. Such pressure measurements can be either absolute or gauge (that is, relative to atmospheric pressure), and the type of transducer used can be selected for use in different operating conditions if desired. By providing an atmospheric pressure sensor, the gauge pressure of the cryogen vessel may be controlled. Alternatively, the actively controlled valve may be operated to maintain a gas egress flow rate within a desired range of values.

Control signals for valves operated by stepper motors, generated by the magnet supervisory control system 30 may easily be derived by those skilled in the art.

For current MRI imaging magnet systems, it has been found that a cyclic valve on/off function at an operating frequency of below 1 Hz is quite sufficient, given the size of the system. Greater frequencies of valve operation may be found necessary, particularly for much smaller cryogen vessels 12.

Typically, the valve element is directly operated by a solenoid. FIG. 2 shows a conventional arrangement of a solenoid valve 42 provided to control cryogen vessel pressure, or rate of cryogen gas egress flow. In FIG. 2, the solenoid valve 42 comprises an actuating coil 44 and an armature 46 carrying, or serving as, a valve element. According to the magnitude and/or direction of electrical current supplied through leads 48 to the actuating coil 44, the armature 46 will move to bring the valve element into contact with, or away from, a valve seat 50. A weak spring 52 urges the valve element towards the valve seat to close the valve when the solenoid is not activated. While the spring is schematically illustrated as a coil spring, any known resilient member may be used as appropriate, such as a leaf spring, a conical spring, a helical spring, or resilient members such as a deformable rubber member. In FIG. 2, the valve is illustrated in a mid-way position, between a fully-open position and a fully-closed position. This is for illustration purposes only, and does not represent a stable position for a solenoid valve.

FIG. 3A shows the valve 42 in a fully open position, typical of the position of a solenoid valve in its "actuated" position—with an actuating current flowing in actuating coil 44.

FIG. 3B shows the valve 42 in a fully closed position, typical of the position of a solenoid valve in its "rest" position—with no current flowing in actuating coil 44. The valve element is urged into contact with the valve seat 50 by spring 52; possibly also by gravity.

In a system such as illustrated in FIG. 1, control system 30 controls the valve so as to maintain a pressure within the cryogen vessel 12 within a desired range of values, or a gas egress flow rate within a desired range of values by the controller changing the on-off time ratio (duty cycle) of cyclically opening and closing the valve 42 by appropriately controlling the current in actuating coil 44. By using a suitably dimensioned valve and operating frequency, the variation in pressure can be maintained within close limits.

In the case of an unexpected over-pressure within the cryogen vessel 12, while the valve is closed (FIG. 3B), the pressure will act on the "upstream" surfaces of the armature 46 and the valve element, to urge the valve tightly into its closed position, with the valve element on the valve seat. This will prevent or impede venting of boiled off cryogen gas from the cryogen vessel, possibly leading to an unwanted build-up of pressure within the cryogen vessel. Such an increase in pressure may lead to an increase in the temperature of the gas, and so raise the temperature of the coils, risking a quench.

Conversely, in the case of an under-pressure within the cryogen vessel 12, while the valve is closed (FIG. 3B), bringing the pressure within the cryogen vessel below the pressure external to the cryogen vessel, the pressure external to the cryogen vessel will act on a surface of the armature 46 and the valve element, to urge the valve open. This may allow the unwanted ingress of air or other contaminants into the cryogen vessel 12 and/or the venting path 25. Such leakage is to be avoided since the cryogen vessel is typically at a temperature well below the freezing point of the major components of air. The ingress of air or other contaminants may cause deposits of frozen contaminants such as nitrogen and water to form within the cryogen vessel 12 and/or the venting path 25. This may cause a blockage which may prevent or impede later venting of boiled off cryogen gas from the cryogen vessel, possibly leading to an unwanted build-up of pressure and an associated increase in temperature within the cryogen vessel at a later time. This may cause a quench, with cryogen unable to vent satisfactorily due to the blockage, causing dangerously high pressure within the cryogen vessel. Solid contamination of the valve may also make pressure control more difficult, while contamination of the magnet structure may cause quench events.

For these reasons, use of a controlled solenoid valve such as discussed above and illustrated in FIGS. 2-3B has been avoided in the prior art, and the use of direct-actuated mechanical valves has remained current, &spite their disadvantages discussed above.

SUMMARY OF THE INVENTION

The present invention addresses these problems restricting the applicability of controlled solenoid valves in maintaining a desired range of pressures in, or gas egress flow rates from, cryogen vessels. In particular, the system according to the invention includes a controlled valve linking the interior of the cryogen vessel to a gas exit path and a controller arranged to control the valve. The valve is arranged such that a gas pressure in the cryogen vessel exceeding a gas pressure in the gas exit path acts on the valve to open the valve and allow venting of cryogen gas. The valve is also arranged such that a gas pressure in the cryogen vessel inferior to a gas pressure in the gas exit path acts on the valve to urge it closed, so restricting flow of gas into the cryogen vessel.

BRIEF DESCRIPTION OF THE DRAWINGS

The above, and further, objects, characteristics and advantages of the present invention will become clearer in consideration of the following description of certain embodiments, given by way of examples only, in conjunction with the accompanying drawing, wherein.

DETAILED DESCRIPTION OF THE INVENTION

Figure 1:
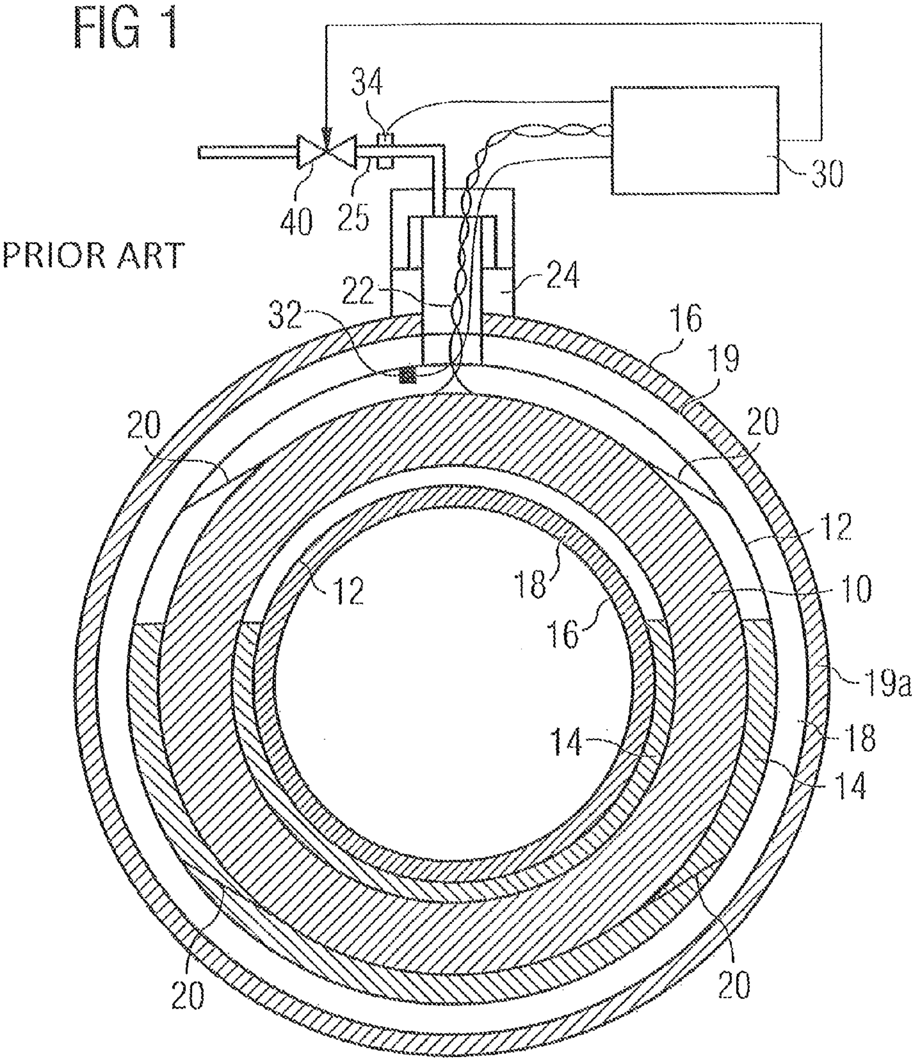
FIG 1 PRIOR ART
FIG. 1 shows a schematic cross-section of a cryostat containing a magnet for an MRI system according to the prior art.
Figure 2:
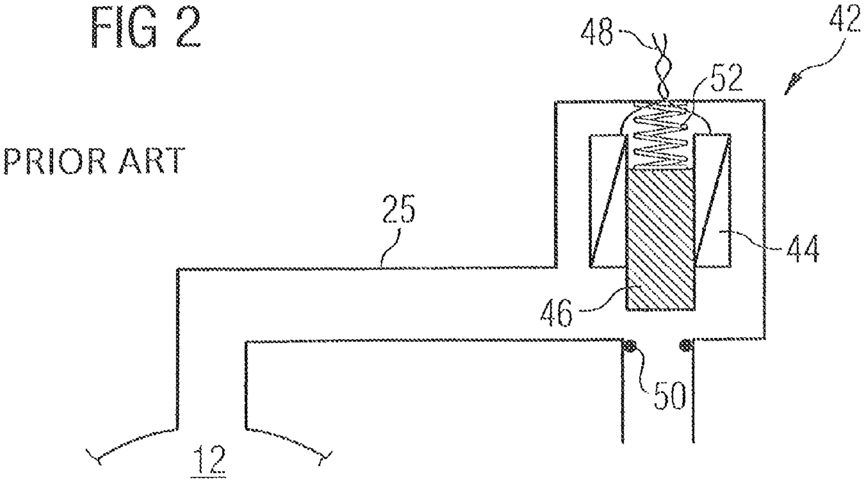
FIG 2 PRIOR ART
FIG. 2 shows a schematic cross-section of a solenoid valve arranged in a cryostat venting arrangement of the prior art.
Figure 3A:
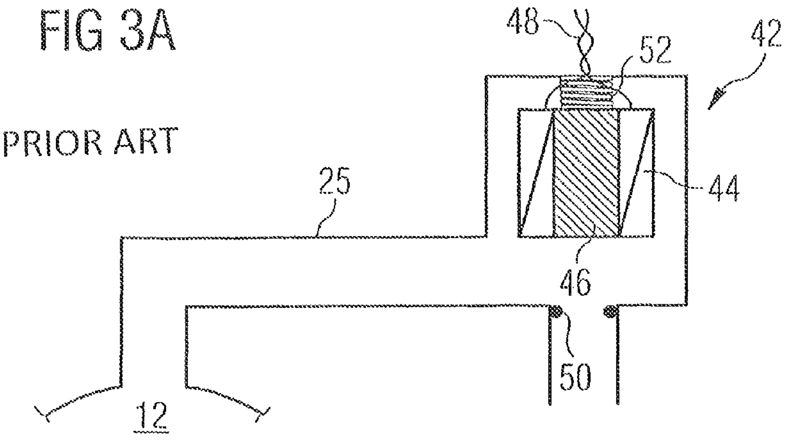
FIG 3A PRIOR ART
FIGS. 3A and 3B show the solenoid valve of FIG. 2 in fully-open and fully-closed positions, respectively.
Figure 3B:
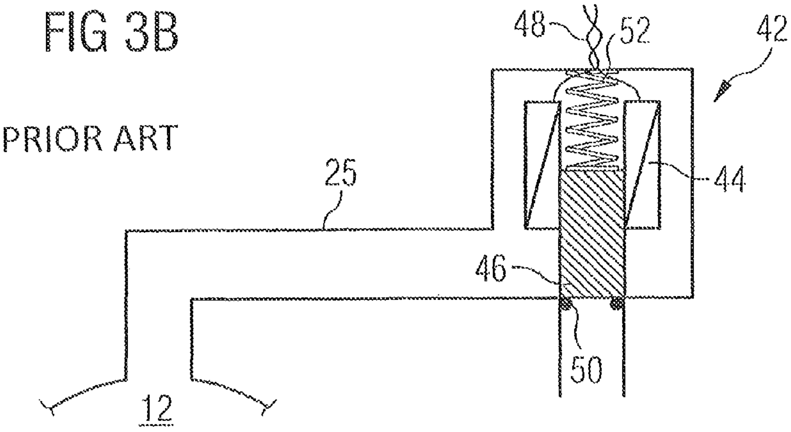
FIG 3B PRIOR ART
Figure 4:
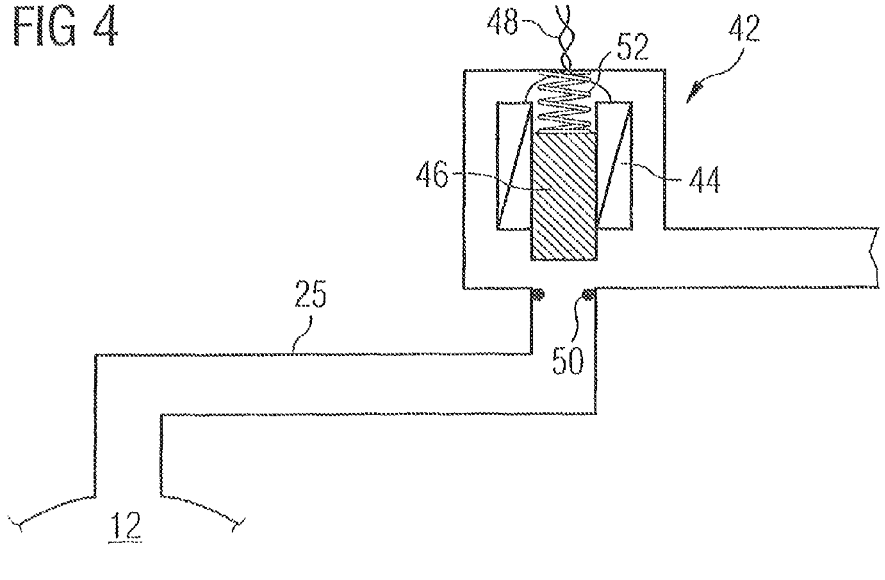
FIG. 4 shows a schematic cross-section of a solenoid valve arranged in a cryostat venting arrangement according to the invention.

The present invention provides an improved arrangement of a solenoid valve 42 to control cryogen vessel pressure, or rate of cryogen gas flow, as illustrated in FIG. 4. Features common with the arrangement of FIG. 2 carry corresponding reference numerals. Essentially, the inlet and outlet ports of the solenoid valve arrangement of FIG. 2 are reversed, so that the former "upstream" and "downstream" surfaces of the actuator 46 swap functions. The valve position illustrated in FIG. 4 is for illustration purposes only, and does not represent a stable position for a solenoid valve.

Figure 5A:
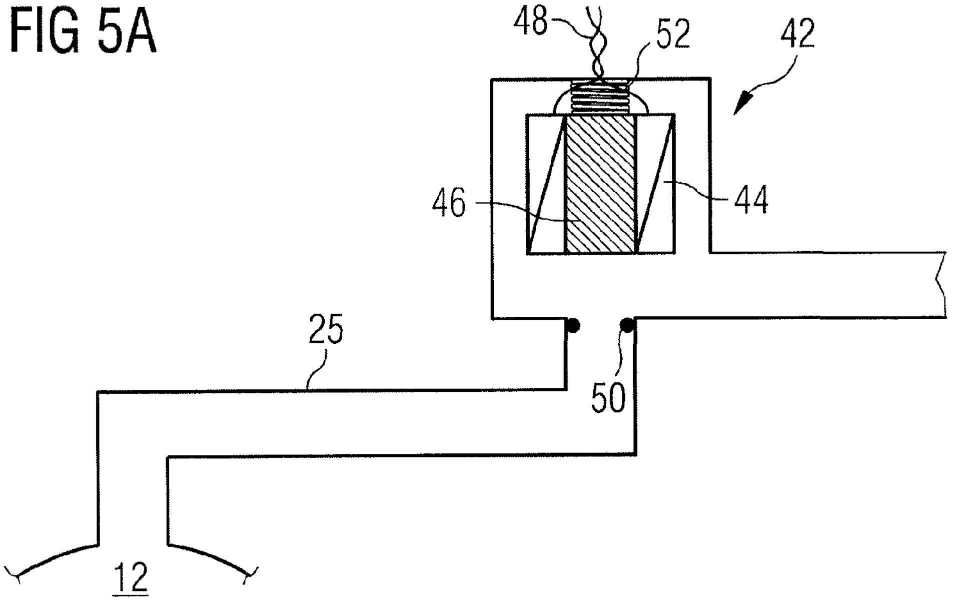
FIGS. 5A and 5B show the solenoid valve of FIG. 4 in fully-open and fully-closed positions, respectively.

FIG. 5A shows the valve 42 of FIG. 4 in a fully open position, typical of the position of a solenoid valve in its "actuated", or energised, position—with an actuating current flowing in actuating coil 44.

Figure 5B:
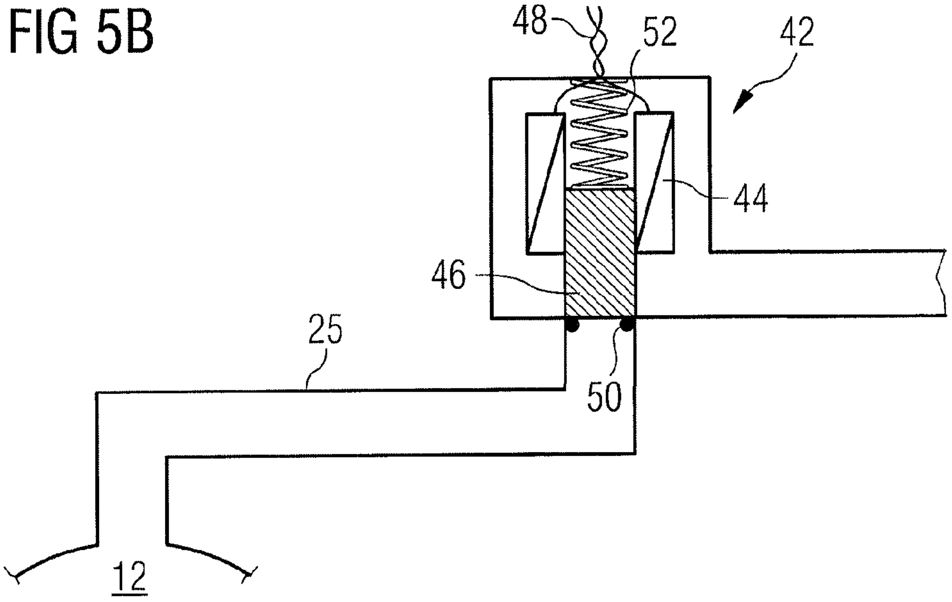

FIG. 5B shows the valve 42 of FIG. 4 in a fully closed position, typical of the position of a solenoid valve in its "rest", or not energised, position—with no current flowing in actuating coil 44. The valve element is urged into contact with the valve seat 50 by spring 52; possibly also by gravity.

According to particular advantages of the present invention, the valve arrangement shown in FIGS. 4-5B advantageously offers passive under-pressure and over-pressure protection.

In the case of an unexpected over-pressure within the cryogen vessel 12, while the valve is closed (FIG. 5B), the pressure within the cryogen vessel will act on the armature 46 and the valve element, to urge the valve element away from the valve seat, opening the valve. This will allow venting of boiled off cryogen gas from the cryogen vessel, preventing an unwanted build-up of pressure within the cryogen vessel.

Conversely, in the case of an under-pressure within the cryogen vessel 12, while the valve is closed (FIG. 5B), bringing the pressure within the cryogen vessel below the pressure external to the cryogen vessel, the pressure external to the cryogen vessel will act on the armature 46 to urge the valve element onto the valve seat, thereby more firmly closing the valve. This will prevent or at least further restrict the unwanted ingress of air into the cryogen vessel 12 and/or the venting path 25.

Accordingly, the present invention provides effective passive protection against both over-pressure and under-pressure events within the cryogen vessel. For these reasons, use of a controlled solenoid valve such as discussed above and illustrated in FIGS. 4-5B may be safely used to provide active control of pressure in, and/or gas outflow rates from, cryogen vessels such as used to cool superconducting coils for magnets for MRI systems. The advantages of active valve control discussed above may accordingly be achieved without risk of air ingress, or unwanted pressure rise, in the cryogen vessel.

A suitable choice of spring 52 load and size of orifice within the valve seat 50, must be made in order to allow cryogen vessel pressure to lift the valve element from the valve seat 50 at a high but safe pressure, thus providing the passive over-pressure safety valve function.

While the present invention has been described with reference to particular embodiments, particularly a solenoid valve as illustrated in FIGS. 2-5B, the present invention may be embodied with any suitable controlled valve, arranged such that an over-pressure in the cryogen vessel acts on the valve to open the valve and allow venting of cryogen gas, and arranged such that an under-pressure in the cryogen vessel acts on the valve to urge it closed, so restricting the flow of gas, particularly air ingress, into the cryogen vessel. The valve must be of a type which does not mechanically lock the valve element in position, but allows some movement of the valve element in response to differential pressure across the valve. In particular, the controlled valve may be a pneumatically operated valve which is open when energised, and closed when not energised. An advantage of a pneumatically controlled valve is that it may be constructed entirely out of non-magnetic materials, and carries no electric current. It should, therefore, not interfere with the magnetic field of a cooled magnet to any appreciable degree. The pneumatic actuation may be operated using electrically controlled valves, such as solenoid valves, but these may be positioned at a relatively large distance from the magnet to avoid interference with the magnetic field.

Cryogen vessels are unusual in that they require safety protection against both over-pressures and under-pressures. It is believed that such simple passive protection against both over-pressures and under-pressures has not previously been provided, and that the present invention provides a simple and effective protection arrangement at minimal additional cost, which has the added benefit of allowing controlled solenoid valves to be used to control cryogen vessel pressures and gas flow rates, while avoiding the disadvantages of known controlled solenoid valve arrangements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for controlling egress of cryogen gas from a cryogen vessel, comprising:

a controlled valve linking the interior of the cryogen vessel to a gas exit path; and a controller arranged to receive data from at least one sensor and to control the controlled valve according to the data;

wherein the controlled valve is arranged such that a gas pressure in the cryogen vessel exceeding a gas pressure in the gas exit path acts on the controlled valve to open the valve and allow venting of cryogen gas, and such that a gas pressure in the cryogen vessel that is inferior to a gas pressure in the gas exit path acts on the controlled valve to urge it closed, so restricting flow of gas into the cryogen vessel;

wherein the controlled valve is a solenoid valve which is open when energized, and closed when not energized;

wherein the solenoid valve comprises an actuating coil, an armature carrying, or serving as, a valve element, and a spring urging the valve element towards a valve seat, in which the actuating coil, armature and spring are built in a gas space of the gas exit path; and wherein an axial direction of the armature corresponds to a flow direction of gas from the cryogen vessel into the solenoid valve, and a contact face of the valve element to the valve seat is opposite to a cross section of the gas flow into the solenoid valve, so that a pressure inside the cryogen vessel exceeding a pressure outside the cryogen vessel acts on the armature and valve element to open the valve, and so that a pressure outside the cryogen vessel exceeding a pressure inside the cryogen vessel acts on the armature to close the valve.

2. Apparatus according to claim 1, wherein the controller is arranged to receive data indicating a gas pressure within the cryogen vessel, and is further arranged to control the controlled valve to provide a gas pressure within a desired range within the cryogen vessel.

3. Apparatus according to claim 1, wherein the controller is arranged to receive data indicating a gas flow rate through the gas exit path, and is further arranged to control the controlled valve to provide a gas flow rate through the gas exit path within a desired range of values.

4. Apparatus for according to claim 1, wherein the controller controls the valve by cyclically opening and closing the controlled valve with a variable duty cycle.

5. The apparatus according to claim 4, wherein said cyclic opening and closing of the controlled valve is performed at a frequency of below 1 Hz.

* * * * *